Patented Jan. 1, 1929.

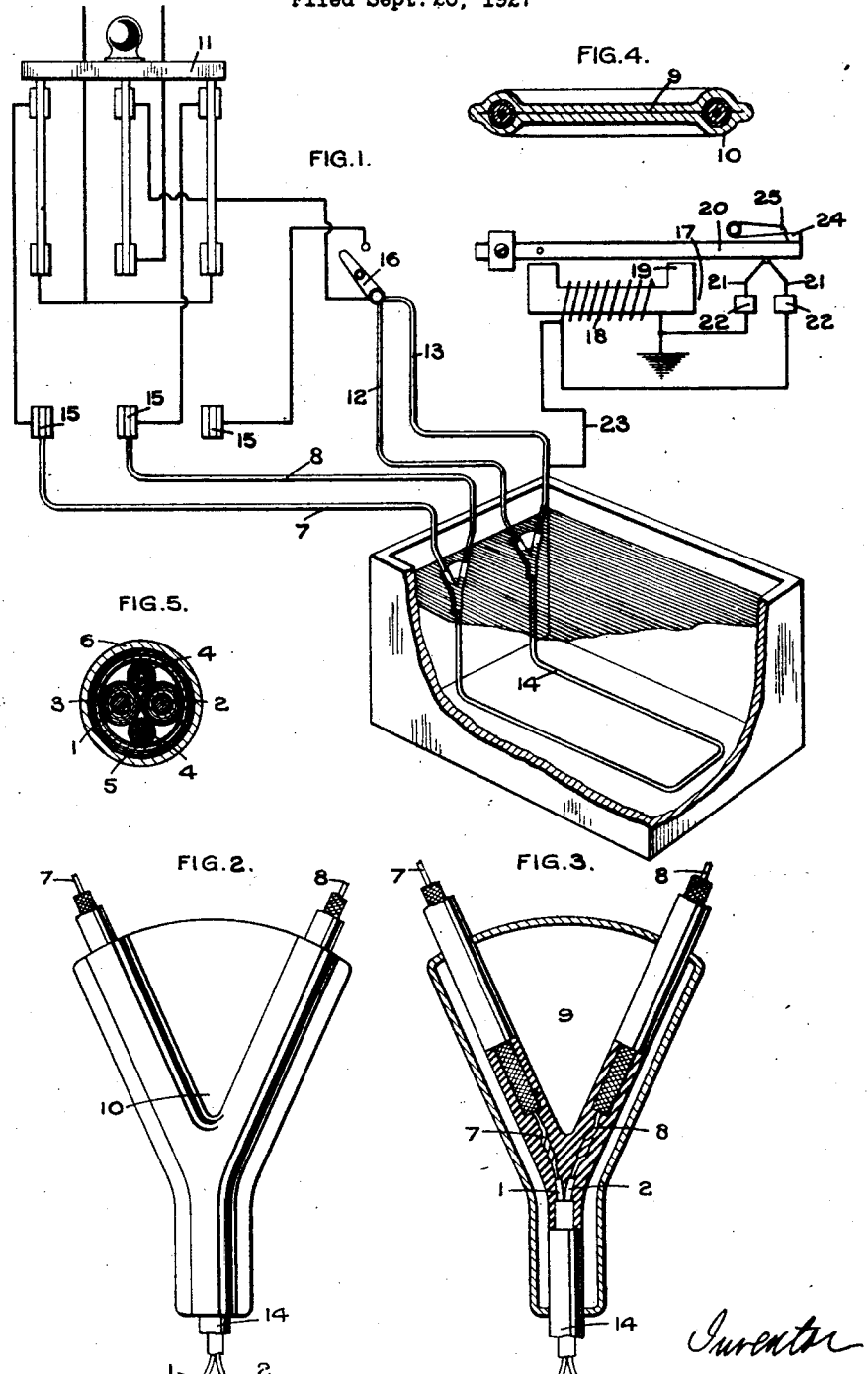

1,697,732

UNITED STATES PATENT OFFICE.

WILFRED YEATES NEWLAND, OF SMALL HEATH, BIRMINGHAM, ENGLAND.

ELECTRICAL HEATING APPARATUS FOR LIQUIDS.

Application filed September 26, 1927, Serial No. 222,069, and in Great Britain September 30, 1926.

This invention relates to electrical heating apparatus for liquids and has for its object to provide an improved construction and arrangement of such apparatus which is applicable to liquids generally but which is primarily intended for use in connection with electroplating.

In connection with the heating of liquids electrically by immersion, it has hitherto been usual to construct the heating elements of high resistance wire, the elements usually being quite small and the heating of the liquid being concentrated at the particular positions where the elements are immersed.

One of the features of the present invention is to employ for heating purposes a resistance element formed as a cable having one or more cores with insulation wound tightly thereon and sheathing which is preferably rolled or pressed thereon.

The material of the core of the heating cable is selected to suit the voltage of the current to be used.

The material used may be iron, steel, or if plating voltage is used, copper.

Several advantages arise from the use of low resistance conducting cables particularly in connection with electroplating and among these advantages may be mentioned the following.

The liability of shocks to the vat or tank operators is eliminated as high voltage currents are not used.

The heat imparted to the liquid is well distributed throughout the vat or tank as the length of the cable or cables is considerable and may vary, for instance, between five and ten yards.

A further feature of the present invention relates to the means employed for connecting the leading in conductors to the resistance cable and according to this part of my invention the end of the conductor is connected to the end of the resistance core and these connected ends are insulated by rubber strip or other suitable material, the joint then being enclosed between two sheet metal members which are pressed together and have their edges welded or otherwise sealed so that a liquid tight casing is formed.

The junction box thus formed can be totally submerged in the liquid to be heated and is always submerged to an extent sufficient to cover the resistance core or cores.

It is, of course, to be understood that this method of constructing the junction box is applicable to cables having one or more cores.

In the case of a resistance cable having more than one core, the cores are separated and each is connected to its individual conductor and each connection is separately insulated although all the connections may be included in one exterior metal box.

A further feature of the present invention is to arrange a cable having more than one core and to provide leading in conductors for the different cores in combination with a suitable switch so that a plurality of different degrees of heat can be obtained by using the cores separately or in series or in parallel.

A cable having a multiplicity of cores may have internal joints in the box so that a short multiple cable when so connected may function as a long single cable.

Where it is found necessary to use a voltage higher than that usually employed for electrodeposition, I may provide a safety earthing appliance for the earthing of the heating element whereby the sheathing is always earthed at a lower resistance than the human body but at a resistance which is too high to permit of serious leakage from an electrolyte vat at ordinary voltages. Such an appliance may include an electromagnet wound with relatively high resistance coil adapted to operate a switch when the potential of the metal sheathing of the heating element rises above a predetermined point.

Referring to the drawings:—

Figure 1 is a perspective view showing the apparatus in diagram form.

Figure 2 is a side view showing one form of junction box.

Figure 3 is a view similar to Figure 2 but showing the box in section.

Figure 4 is a sectional plan view of the junction box.

Figure 5 is a cross section of the heating element constructed in cable form.

In the construction illustrated the heating element shown is provided with two cores 1, 2 each of which is individually insulated by a winding or wrapping of oiled paper or other material shown at 3. This winding is applied under considerable tension with the object of avoiding air gaps between the cores 1 and 2 and the exterior of the insulation.

Filling members of any suitable material such as insulating paper may be inserted as shown at 4 and an outer winding of resistance material such as paper may be used at 5, the whole being enclosed in a metal sheath 6 which may be rolled on to the cable between pressure rollers.

If required, the insulation 5 may be omitted.

The characteristic feature of the heating element is that it is constructed as a continuous cable and that the cores employed are made of material such as copper, iron or nickel chrome steel and pressure or tension is employed in applying the sheathing and insulation so that good contact is obtained for heat conducting purposes between the cores and the exterior of the sheathing.

By using a heating cable with the core or cores of copper, iron or steel I provide a heating element which can be used with voltages ranging from 6 volts upwards.

The ends of the cores 1 and 2 have to be connected to the leading in conductors such as 7 and 8 (see Figures 2 and 3), and for this purpose the ends of the cores 7 and 1 are bared and twisted together, the ends of the cores 2 and 8 being similarly treated.

The joints are then wrapped in an insulating material such as rubber which is wound on under tension and secured by suitable means.

It will be seen that the ends of the cores 1 and 2 are bent apart in V formation and it will be understood that if there are more than two cores, all the cores will be bent apart to as great an angle as may be found desirable.

The junction box is made in two sections 9, 10 of sheet metal such as lead. These sections, in the case of a two cored cable, are shaped somewhat like a Y and they are placed together as shown in Figures 2, 3 and 4 and their edges burnt or welded or otherwise secured together to make a liquid tight joint.

The junction box thus constructed can be submerged or partially submerged in the liquid to be heated so as to prevent overheating of the cores 1 and 2.

In Figure 1 I have shown a three pole switch indicated generally at 11 controlling the four conductors 7, 8, 12 and 13 which are connected to the ends of a two core heating cable element 14. When the switch is in the positon shown in Figure 1, the two cores 1, 2 of the heating element 14, are connected in parallel. When the switch is moved so as to connect to the contacts 15, the two cores 1, 2 are connected in series.

The circuit includes a simple switch 16 and when this switch is closed and the main switch 11 is connected to the contacts 15, only one core of the heating cable is working.

In order to avoid damage to the operators from shocks from the heating elements, I may provide the appliance shown generally at 17 in Figure 1.

This appliance includes a resistance coil of, say, about 50 ohms shown at 18, this coil being arranged on a suitable core 19 and co-operating with a lever 20 which forms a switch arm, the lever having contacts 21 which are adapted to enter mercury pots 22.

The arrangement is such that normally the leakage from the sheathing of the heating element 14 is insufficient to energize the electromagnet 18, 19, but if the potential of the sheathing rises above a predetermined limit, the electromagnet is energized sufficiently to pull down the lever 20 and close the switch 21, 22 so that the sheathing of the element 14 is then earthed through the medium of the conductor 23.

The lever arm 20 may be provided with a shoulder 24 adapted to be engaged by a pawl 25 so that the earthing switch is kept closed automatically when it has once been operated until it is reset.

If required, an adjustable weight 26 or a spring may be provided acting on the lever arm 20 and tending to raise it.

What I claim then is:—

1. In electrical heating apparatus for liquids the combination of a heating element; means for varying the heat in said element; a junction box surrounding a part of said element; and means for automatically earthing said heating element; for the purpose specified.

2. Electrical heating apparatus for liquids including a heating element comprising a number of insulated conducting cores having a surrounding external sheathing; a leading in conductor connected to each end of the heating element; and a junction box adapted to enclose the joint between the heating element and leading in conductor and prevent the ingress of liquid thereto.

3. Electrical heating apparatus for liquids including a heating element comprising a number of insulated conducting cores having a surrounding external sheathing; a leading in conductor; and a junction box adapted to enclose the joint between the conducting core and leading in conductor, the junction box being formed in two parts placed one on each side of the joint and secured together at its edges.

4. In electrical heating apparatus for liquids the combination of a resistance wire constituting the heating element and means for automatically earthing the said element when the electrical potential rises above a predetermined point.

5. In electrical heating apparatus for liquids the combination of a heating element comprising a resistance wire cable having a metallic sheathing; an electric magnet the coil of which is connected to said sheathing; and an earthing switch controlled by said magnet and so arranged that when the potential in the sheathing rises above a predetermined limit the sheath is connected to earth.

6. Apparatus for heating liquids comprising the combination of a heating element having a resistance core which is inelastic in a radial direction, insulation under tension surrounding said core, and an outer metallic sheathing, leading in conductors connected to the ends of said core, and a liquid tight casing around the joints between the leading in conductors and said core.

In witness whereof I affix my signature.

WILFRED YEATES NEWLAND.